(12) United States Patent
Teets

(10) Patent No.: US 6,401,658 B1
(45) Date of Patent: Jun. 11, 2002

(54) HEIGHT ADJUSTMENT BIRD FEEDER APPARATUS

(76) Inventor: W. Bradley Teets, 3030 Abbottsford Rd., Ruby, MI (US) 48049

( * ) Notice: Subject to any disclaimer, the term of this patent is extended or adjusted under 35 U.S.C. 154(b) by 0 days.

(21) Appl. No.: 09/648,903

(22) Filed: Aug. 25, 2000

(51) Int. Cl.⁷ .............................................. A01K 39/01
(52) U.S. Cl. .................. 119/57.9; 119/52.2; 248/125.8; 248/530
(58) Field of Search ............................... 119/52.2, 52.3, 119/57.8, 57.9; 248/125.8, 178.1, 231.9, 219.3, 295.11, 530

(56) References Cited

U.S. PATENT DOCUMENTS

| | | | | |
|---|---|---|---|---|
| 680,231 A | * | 8/1901 | Deppe | ..................... 248/125.8 |
| 2,804,844 A | * | 9/1957 | Gigliotti | ................ 119/52.2 X |
| 4,355,597 A | | 10/1982 | Blasbalg | |
| 4,628,865 A | * | 12/1986 | Lehmann | ................... 119/57.9 |
| 4,819,584 A | | 4/1989 | Rozumek | |
| 5,826,852 A | | 10/1998 | McKeown | |
| 6,016,768 A | * | 1/2000 | Colucci | ..................... 119/57.9 |
| RE36,550 E | | 2/2000 | West | |

* cited by examiner

*Primary Examiner*—Robert P. Swiatek
(74) *Attorney, Agent, or Firm*—Peter D. Keefe (57) ABSTRACT

A height adjustable bird feeder apparatus which allows for the selective lowering and raising of a bird feeder relative to a stationary, vertically oriented pole, wherein the apparatus includes a pole, a sleeve concentrically mounted to the pole so as to be slidable therealong, an article, preferably a bird feeder, mounted to the sleeve, and a sleeve retention mechanism. The sleeve extends entirely through the bird feeder at the center of gravity. The sleeve retention mechanism has a plurality of sets of diametrically opposed holes formed in the pole which receive therethrough a removable pin. An optional critter guard is located at the bottom of the sleeve. When the feed becomes depleted, the user removes the pin and lets the sleeve slid down the pole to the bottom. At this height, the bird feeder feed reservoir is now easily replenished. After filling, the user lifts the bird feeder and sleeve combination back up the pole and reinserts the pin.

18 Claims, 6 Drawing Sheets

HEIGHT ADJUSTMENT BIRD FEEDER APPARATUS

BACKGROUND OF THE INVENTION

1. Field of the Invention

The present invention relates to bird feeders and poles used therewith to provide an elevated location of operation. More particularly, the present invention relates to a bird feeder slidably mounted to a pole, wherein periodic resupply of feed is accomplishable without need of a ladder by lowering the bird feeder slidably in relation to the pole.

2. Description of the Prior Art

Bird feeders not only provide sustenance for birds, they provide endless hours of entertainment for those persons who provide them. The many kinds of beautiful birds that come to feed are a delight to watch and hear them sing, and their antics while feeding are added visual bonus.

There are several different kinds of bird feeders, for example: a hopperfeeder (having a house-like configuration), a tube feeder (having a vertically oriented tube shape), a suet feeder (having a box-like shape with a matrix of "pigeon holes") a nectar feeder (having a number of liquid orifices at the bottom of a vessel) a window feeder (having a clear plastic, open box configuration), and a platform feeder (having a planar base configuration).

Bird feeders are generally kept at an elevated location via a pole. The pole is vertically oriented and supported in or on the ground. The bird feeder is usually connected to a top end of the pole, as for example described in U.S. Pat. No. 4,819,584. Other modalities for elevating bird feeders are also possible, however, such as by hanging from a spirally shaped arm, as described in U.S. Pat. No. 5,826,852.

In time, the bird guests will eat the supply of feed contained in the feed reservoir of the bird feeder, necessitating feed replenishment. This usually necessitates someone getting out a ladder, setting it up, climbing it with care, filling the bird feeder with feed while keeping one's balance, climbing down, and then putting the ladder away. The need to have a ladder and the effort and danger associated with using it to replenish the feed reservoir are problems for many people, and is no doubt a major reason why some people do not have a bird feeder even though they would love to have one in their backyard.

While it is possible to have a bird feeder mounted low to the ground (for example by being mounted atop a short pole), this is unwise because it subjects the birds to the danger of being caught (as for example by a cat), and runs contrary to a bird's nature to roost in high places. On solution to the problem of using a tall pole to mount a bird feeder is present in the aforementioned U.S. Pat. No. 4,819,583, wherein the pole is provided with an articulation feature midway along its length. While this may at first seem like an excellent solution, the pivoting of the upper portion of the pole at the articulation point results in the bird feeder orientation similarly tilting, as for example about 90 degrees, which complicates how to replenish feed in the reservoir. However, U.S. Pat. No. 4,819,583 solves this problem by mounting the bird feeder pivotally in relation to the pole, but this is a complication, and still involves a rather awkwardly effected tilting down and tilting up of the upper portion of the pole (which could be hard to accomplish by physically challenged persons and senior citizens).

Accordingly, what remains needed in the bird feeder art is a bird feeder apparatus which provides height adjustment of the bird feeder which is simple, safe and easy to accomplish.

SUMMARY OF THE INVENTION

The present invention is a height adjustable bird feeder apparatus which allows for the selective lowering and raising of a bird feeder relative to a stationary, vertically oriented pole.

The height adjustable bird feeder apparatus according to the present invention includes a pole, a sleeve concentrically mounted to the pole so as to be slidable therealong, an article mounted to the sleeve, and a selectively operable sleeve retention mechanism.

The article is preferably a bird feeder which may be of any type, as for example a hopper feeder (which is most preferable, a tube feeder, a suet feeder, a nectar feeder, a window feeder, a platform feeder or any fanciful design, such as an old fashioned delivery truck. However, the article may be any desired object, as for example a bird house, a wind vane, etc. In a preferred form of the present invention, the sleeve extends entirely through the article, most preferably through a region at or near the center of gravity of the article. The sleeve has in inside diameter which is just larger than the outside diameter of the pole, whereby the sleeve is readily slid along the pole. The preferred sleeve retention mechanism is in the form of one or more sets (pairs) of diametrically opposed holes formed in the pole which receive therethrough a removable pin. It is preferred to include further a critter guard located at the bottom of the sleeve, wherein a radially extended shape inhibits critters, such as cats and squirrels from gaining access to the article via the pole.

In operation, a user erects the pole into a vertical orientation by either placing one end firmly in the ground, or by mounting the pole upon the ground via a base. If the sleeve is not already mounted onto the pole, the user next places the sleeve onto the pole at the distal end of the pole (which is closed or capped to keep out precipitation). The pin is inserted into a set of diametrically opposed pole holes, and the sleeve rests thereupon. The user may then select an orientation of the article by rotating the article relative to the pole, the allowed rotations may be infinitely selectable or discretely predetermined, such as for example by notches on the sleeve engaging the pin.

In the case of the article being a bird feeder, the user will have filled, or now fills the bird feeder reservoir with feed (inclusive of nectar, etc., as may be appropriate) and then delights in watching the bird guests come and go. When the feed becomes depleted, the user need merely grab the relatively light bird feeder and sleeve combination, gently remove the pin and let the sleeve slide down the pole to the bottom. At this height, the bird feeder feed reservoir is now easily and quickly replenished while the user stands on the ground and works comfortably. After filling the feed reservoir, the user lifts the bird feeder and sleeve combination to a location on the pole so that the pin can be reinserted into a set of pole holes below the sleeve. The sleeve is then gently allowed to come to rest on the pin and the orientation of the bird feeder is then adjusted, if necessary.

Accordingly, it is a primary object of the present invention to provide a height adjustable bird feeder apparatus, wherein the height of a bird feeder is easily effected by a vertical sliding movement along a pole.

This, and additional objects, advantages, features and benefits of the present invention will become apparent from the following specification.

DETAILED DESCRIPTION OF THE PREFERRED EMBODIMENT

Figure 1:
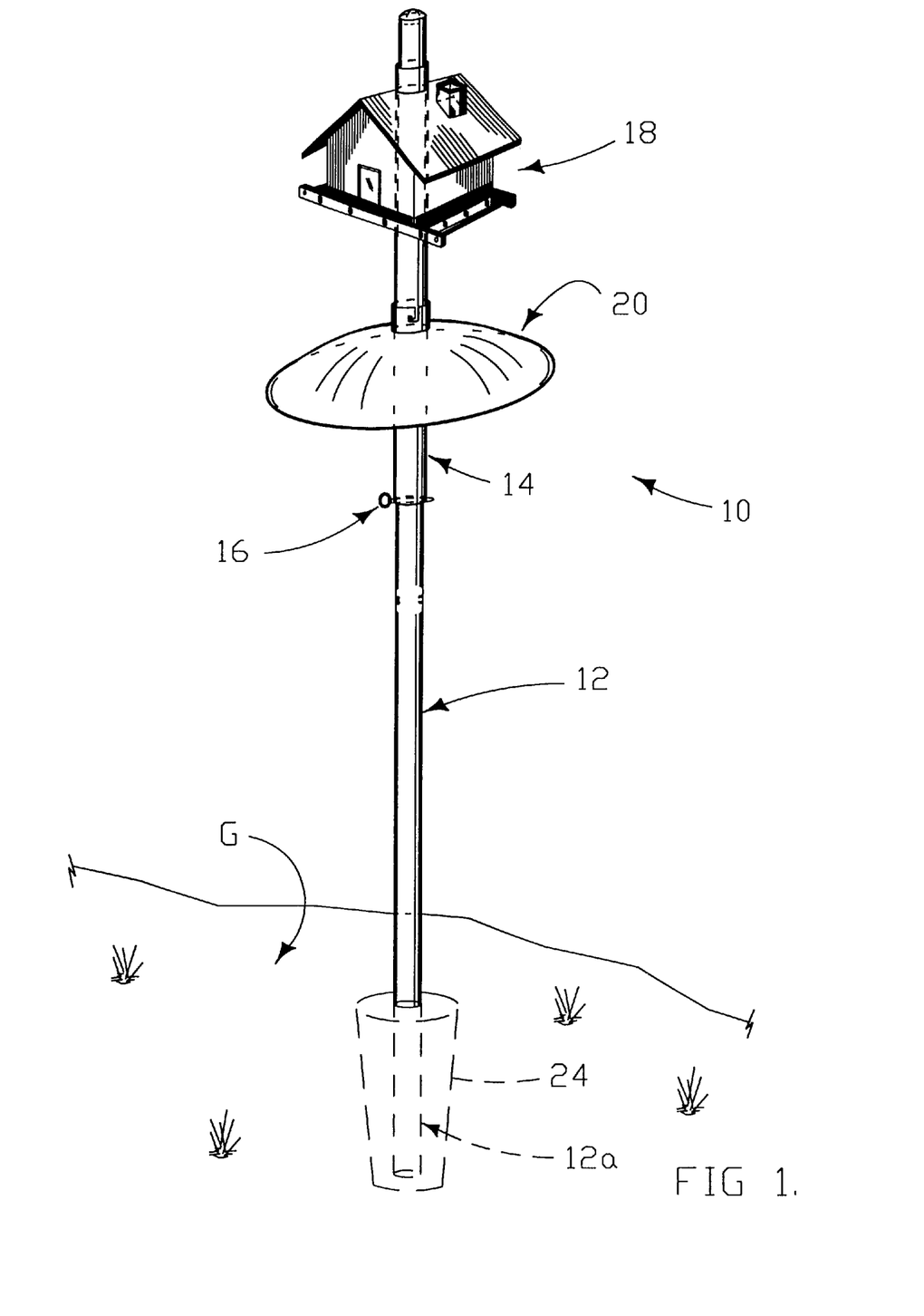
FIG. 1 is a perspective view of the height adjustable bird feeder apparatus according to the present invention.

Referring now to the Drawing FIG. 1 depicts an example of a height adjustable bird feeder apparatus 10, including a post 12, a sleeve 14, slidably mounted on the post, a retention mechanism 16 for selectively retaining the sleeve at a selected location of the post, an article in the form of a bird feeder 18 mounted to the sleeve, and an optional critter shield 20 which is mounted to the sleeve.

The post 12 is an elongated, structurally rigid member, having preferably a hollow construction. The post 12 may be of a cylindrical cross-section, or may be otherwise, as for example of a square cross-section. The diameter of the post 12 may be any suitable diameter, as for example between one and three inches. The wall thickness of the post 12 is selected to render rigidity thereto consistent with the strength of the material composition thereof. Examples of preferred materials of the post 12 include rust protected steel, which is preferred (preferably painted and/or galvanized) and aluminum (preferably painted and/or anodized). Other compositions are possible, as for example plastic (preferably UV stabilized) and wood (preferably pressure treated, wherein the post cross-section is not hollow, but solid). The length of the post 12 is any desired length consistent with the intended elevation of the bird feeder 18, as for example between six and eighteen feet. While the post 12 may be of single piece construction, it may be of a segmented, interconnecting construction.

In operation, a near end portion 12a of the post is secured vertically relative to the ground 22. This is conventionally accomplished by digging a hole in the ground G, placing the near end portion 12a into the hole, and then filling the hole with concrete 24. Alternatively, the near end portion may be held vertically by a base resting upon the ground, as for example of the kind of base conventionally used to support posts for basketball hoops atop driveways.

The sleeve 14 has a hollow cross-section forming an interior hollow 26 into which the post 12 is received. In this regard the interior cross-section of the sleeve 14 at the interior hollow 26 is sized to exceed the exterior cross-section of the post 12 sufficient to provide easy slidability of the sleeve along the post without an undue amount of play, and wherein the shape of the interior surface 14s of the sleeve 14 complements the shape of the exterior surface 12s of the post. The length of the sleeve 14 is sufficient to pass through the bird feeder 18 and extend a selected amount therebelow (discussed further hereinbelow), and is in general much shorter than the post 12. The sleeve 14 may, for example, be composed of aluminum (preferably painted and/or anodized), steel (preferably painted and/or galvanized, as the post 12, or a plastic material (as for example formed by a blow molding process, and preferably UV stabilized).

Figure 2:
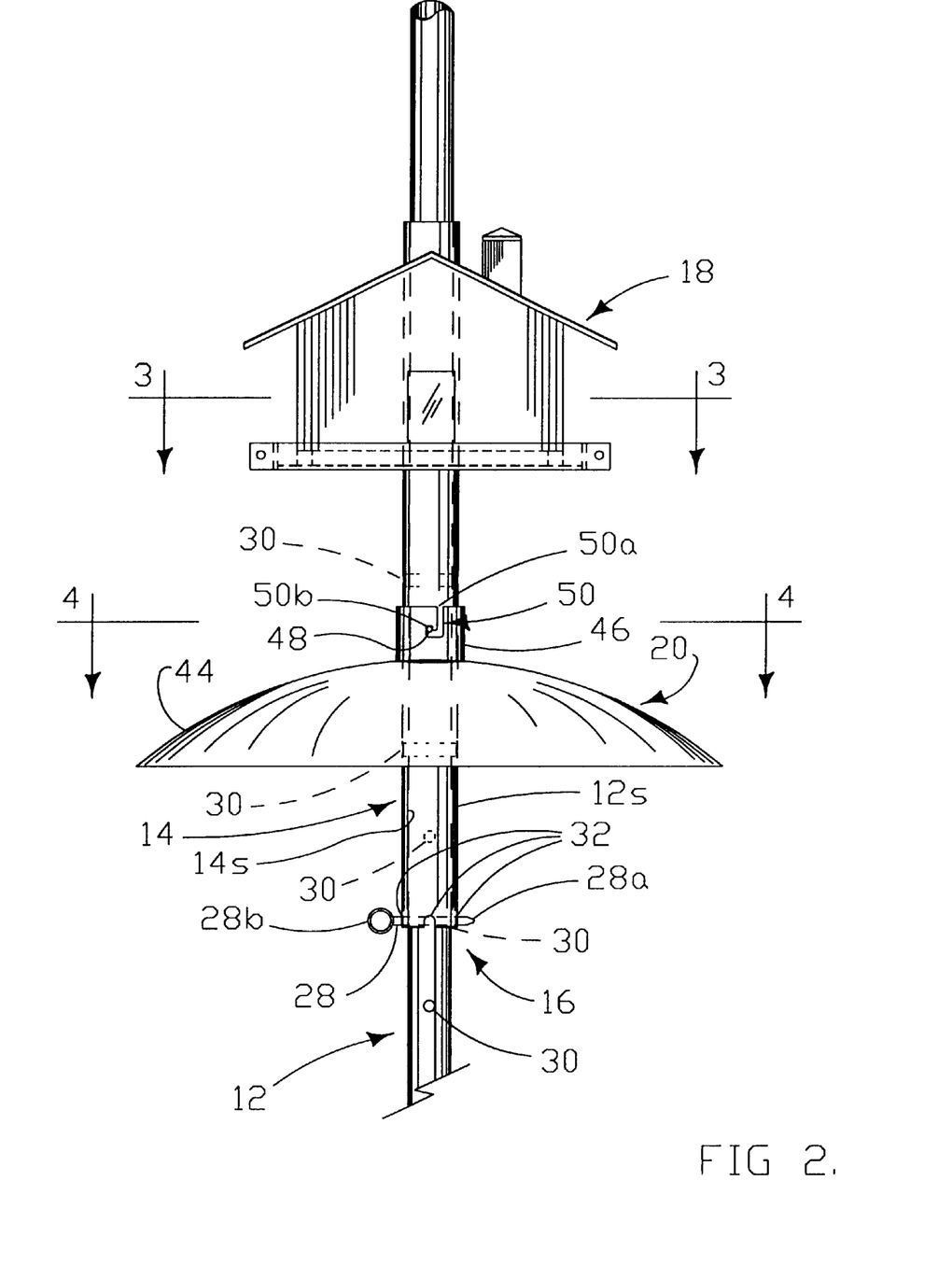
FIG. 2 is a detail side view of the height adjustable bird feeder apparatus according to the present invention.
Figure 3:
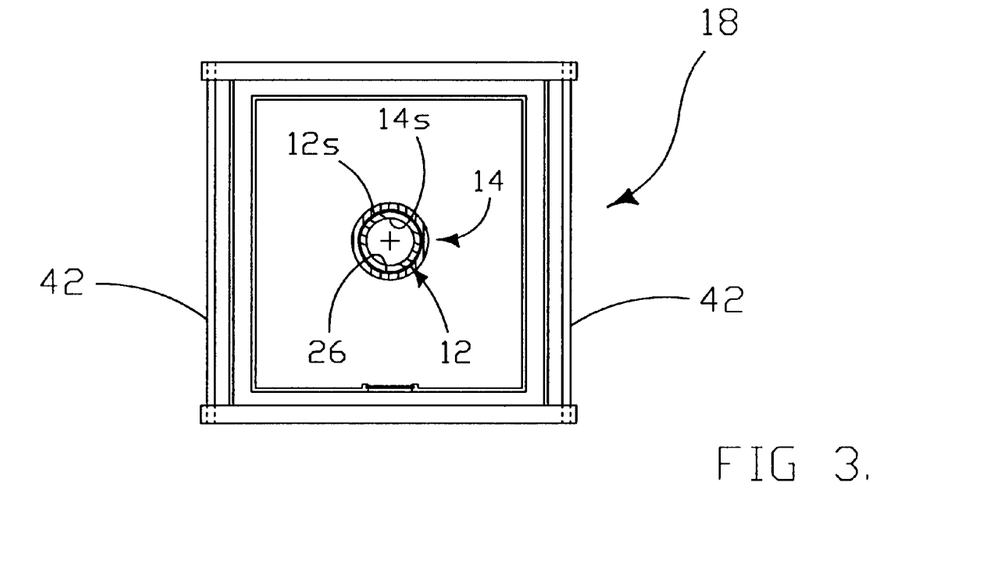
FIG. 3 is a is a partly sectional view, seen along line 3—3 of FIG. 2.
Figure 4:
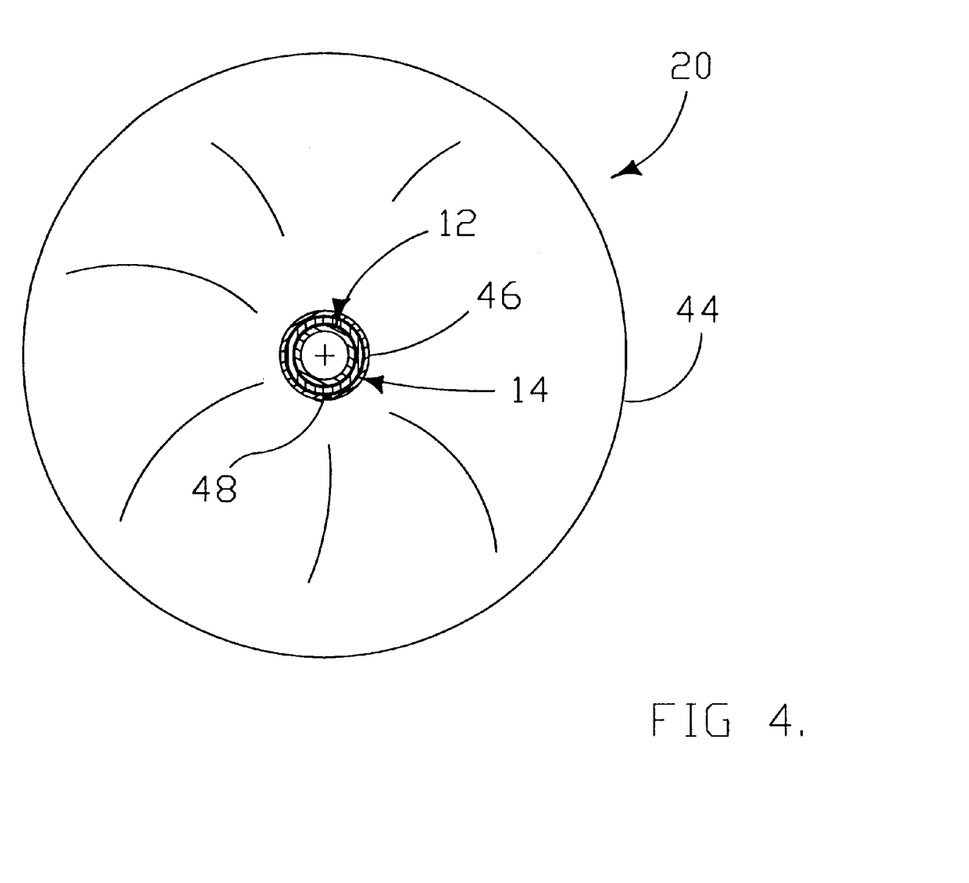
FIG. 4 is a is a partly sectional view, seen along line 4—4 of FIG. 2.

The sleeve 14 is slidable on the post 12, but the sliding is selectively restricted by the retention mechanism 16 so as to vertically support the sleeve at a selected location of the post. While the retention mechanism may have any known interferingly engageable form, a preferred form of retention mechanism is a pin 28 which is removably received into a diametrically opposed set (pair) of holes 30 of the post 12, wherein the pin extends outwardly from each of the opposed holes, such that the exposed pin serves as sleeve abutments for the near end 14a of the sleeve. In this regard, it is preferred for the near end 14a of the sleeve to have a plurality of diametrically opposed notches 32 formed thereat which provide a concave resting location for the exposed pin, and wherein the resting serves to provide a selected orientation for the sleeve relative to the post (which, as a consequence serves as a bird feeder orientation provision). It is further preferred for a number of opposed sets of holes 30 to be provided along the post so that the height of resting of the sleeve on the post may be selected by choice thereof for placement therein of the pin 28. It is preferred for the lowest set of opposed holes 30 to be about 48 inches above the ground so that children's fingers will not be accessible to them. The pin 28 preferably has a tapered hole entry end 28a and an opposite finger pull ring 28b.

The bird feeder 18 is of any conceivable design, shape and construction, as for example a hopper feeder (which is most preferable, a tube feeder, a suet feeder, a nectar feeder, a window feeder, or a platform feeder, and is composed of any building material, as for example wood and/or plastic and/or metal. The sleeve 14 passes entirely through the bird feeder 18, and the bird feeder is fixedly mounted to the sleeve by any known type of affixment modality, as for example fasteners, an interference fit or an adhesive. While not a requirement, it is preferred for the sleeve 14 to pass generally through the center of gravity of the bird feeder so as to provide over-all stability.

The bird feeder includes a cavity thereinside which serves as a feed reservoir 34. An access port 36 is preferably provided, and the feed 35 which is in the feed reservoir 34 exits therefrom via one or more outlets 38 suitable for the type of feed (which may be a liquid feed, such as nectar). In this regard, where the feed reservoir 34 extends to the location of the sleeve 14, the sleeve can serve as a feed retention wall 40. Roosts 42 may be included with the bird feeder 18.

The optional critter guard 20 is connected with the sleeve 14 and has a radially extended configuration preferably in the form of a dish 44 concavely shaped from the bird feeder and concavely shaped toward the near end 14a of the sleeve 14 so as to serve as an impediment to critters such as cats, racoons, squirrels, etc. from gaining access to the bird feeder by climbing of the pole 12. A flange 46 is connected with the dish 44 for stably connecting the critter guard 20 to the sleeve 14. While the flange 46 may be permanently affixed to the sleeve 14, as for example by an adhesive, soldering, brazing, welding, to fasteners, it is preferred for the flange to be removably connected to the sleeve. An example of a removable connection modality is in the form of a boss 48 radially extending from the sleeve 14 which pass through a serpentine slot 50 formed in the flange 46, the slot including an entry 50a and a rest 50b (see FIG. 2). The flange 46 and dish 44 may be composed of any suitable material, as for example aluminum (painted or anodized) or injection molded plastic (UV stabilized).

In operation, a user erects the pole 12 into a vertical orientation by either placing one end onto the ground G via a base, or by digging a hole, putting the near end portion 12a thereinto and filing it with concrete 24. If the critter guard 20 is not already installed on the sleeve 14, this should be done prior to the sleeve being installed on the pole. If the sleeve 14 is not already mounted onto the pole, the user next places the sleeve onto the pole at the distal end of the pole (which is closed or has a cap 52 to keep out precipitation). The pin 28 is inserted into a selected set of diametrically opposed pole holes 30, and the sleeve rests thereupon via the notches 32. The user may then select an orientation of the article by rotating the article relative to the pole, the allowed rotations may be infinitely selectable or discretely predetermined, such as for example by notches on the sleeve engaging the pin.

Figure 5:
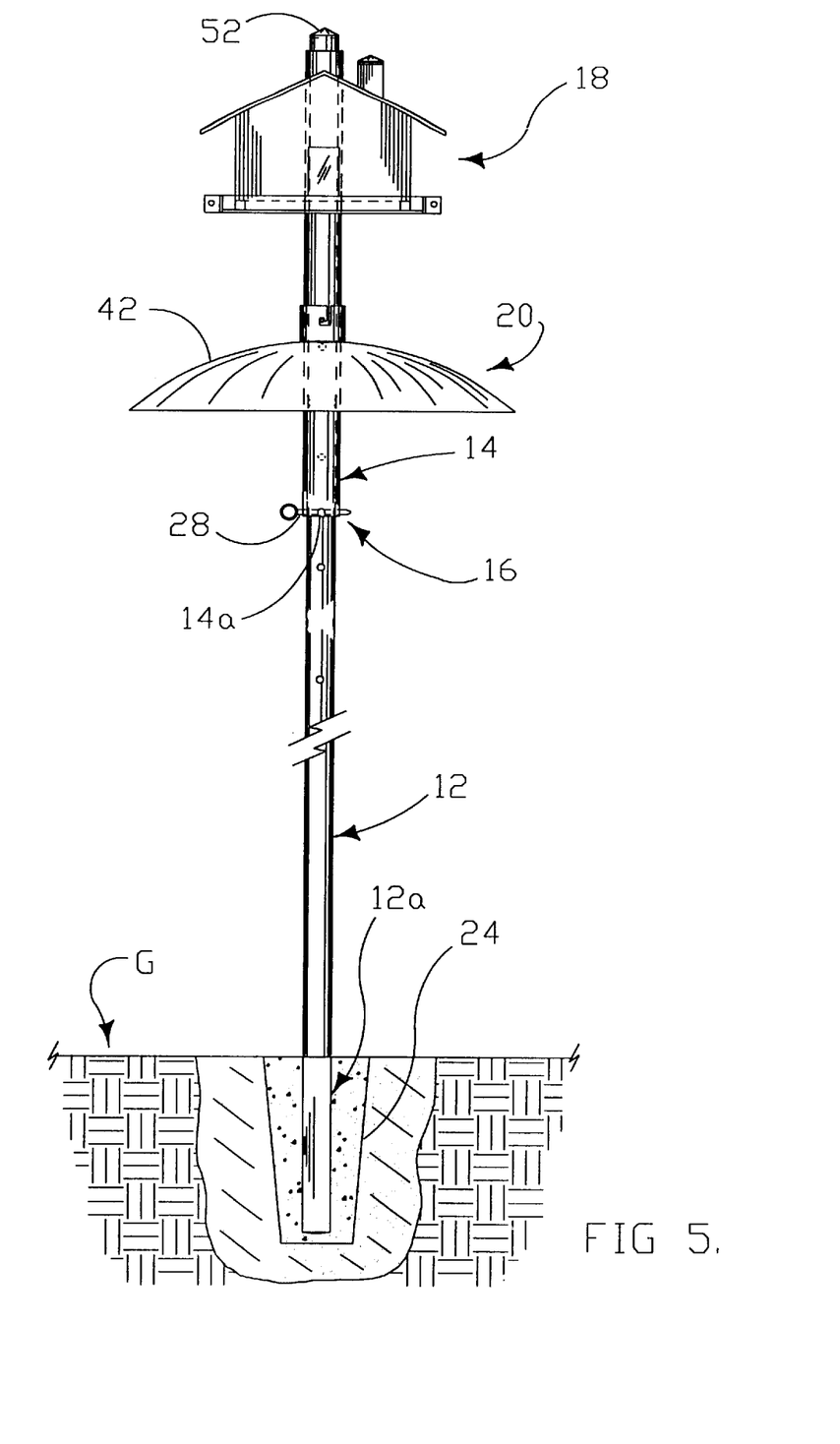
FIG. 5 is a side view of the height adjustable bird feeder apparatus, seen at a first operational position of the bird feeder.
Figure 6:
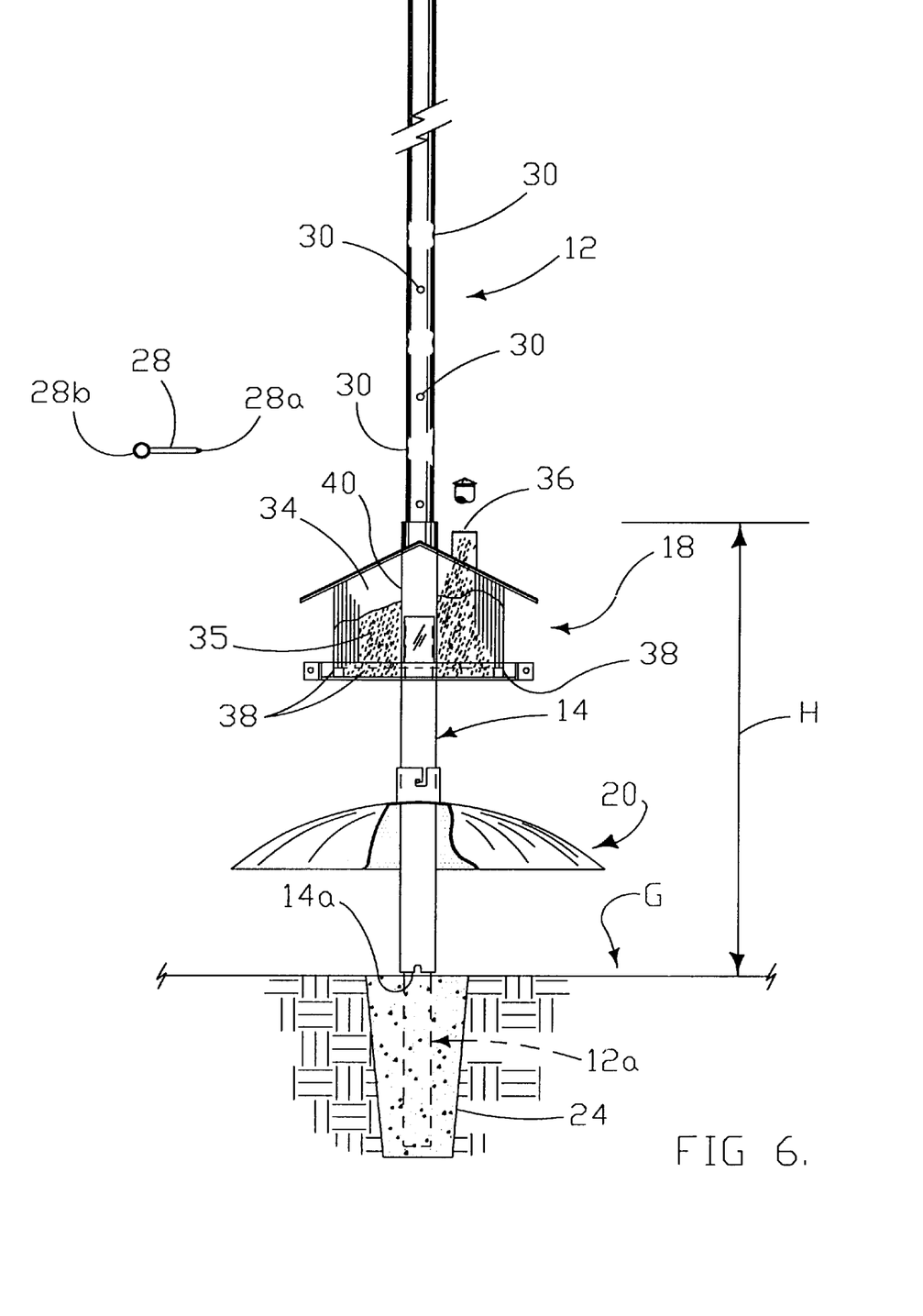
FIG. 6 is a side view of the height adjustable bird feeder apparatus, seen at a second operational position of the bird feeder.

With the feed reservoir already filled (inclusive of nectar, etc., as may be appropriate) the user and others can now delight in watching the bird guests come and go (see FIG. 5). When the feed becomes depleted, the user need merely grab the relatively light bird feeder and sleeve combination, gently remove the pin and let the sleeve slide down the pole to the bottom (see FIG. 6). In this regard, the sleeve extends downwardly from the bird feeder a distance determined to allow for the feed filling to be at waist to shoulder height of an average user, with the near end 14a of the sleeve resting on the concrete 24, ground, base etc. At this height H, the bird feeder feed reservoir is now easily and quickly replenished while the user stands on the ground and works comfortably. After filling the feed reservoir 34, the user lifts the bird feeder and sleeve combination to a location on the pole so that the pin can be reinserted into a set of pole holes below the sleeve. The sleeve is then gently allowed to come to rest on the pin and the orientation of the bird feeder is then adjusted, if necessary. Now the bird feeder has returned to the operative position of FIG. 5.

Figures 7, 8:
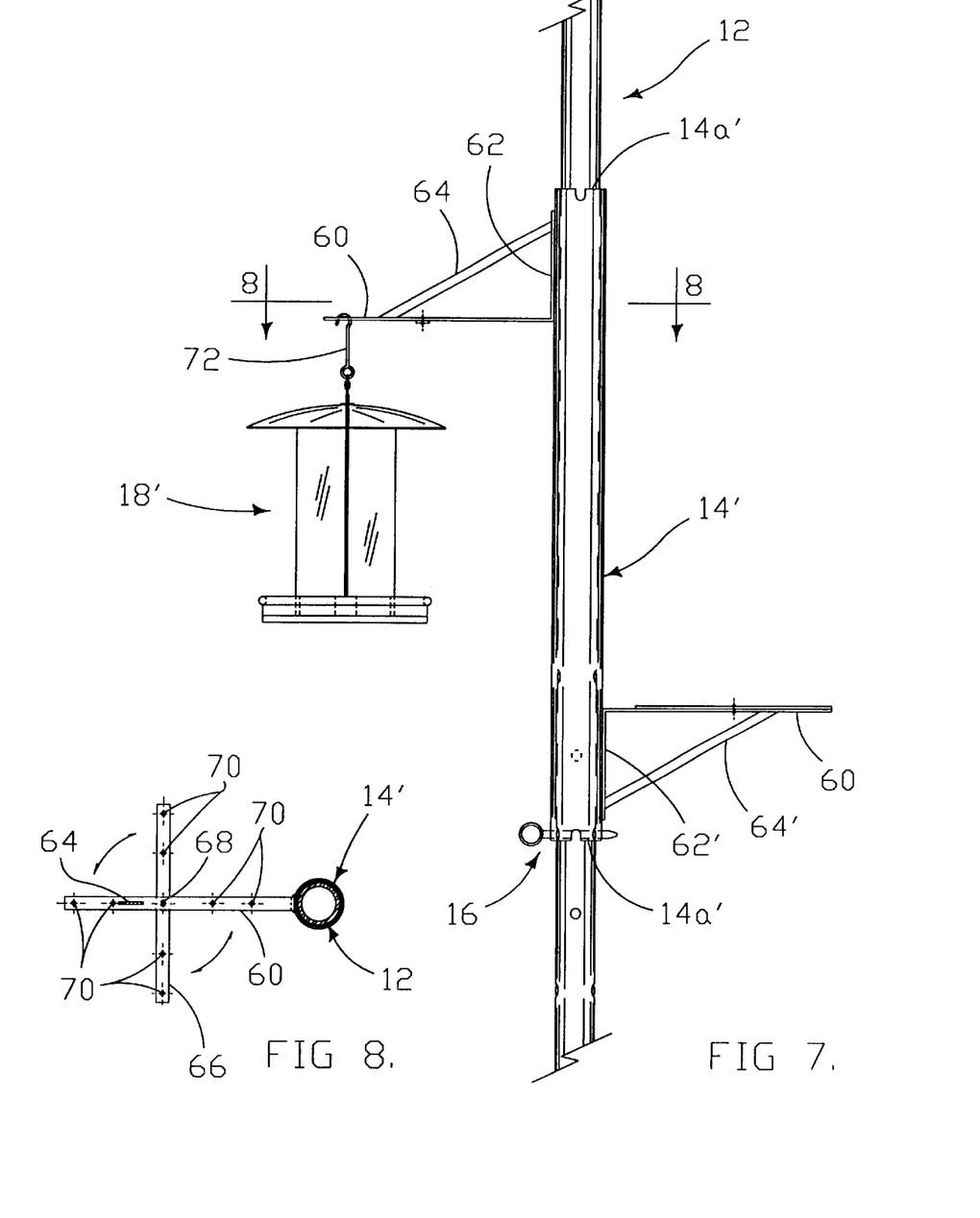
FIG. 7 is a detail side view of an alternative embodiment of the height adjustable bird feeder according to the present invention.
FIG. 8 is a partly sectional view, seen along line 8—8 of FIG. 7.

FIGS. 7 and 8 show an alternative embodiment of the present invention, wherein the pole 12 and retention mechanism 16 are as described hereinabove, but wherein the sleeve 14' is modified so as to have connected thereto at least one support arm 60, Each support arm 60 is connected to the sleeve via a bracket 62, 62' which is glued, sonic welded, brazed or otherwise appropriately connected to the sleeve consonant with the materials of choice of the sleeve and each support arm so that each support arm has a fully supported radially outward orientation relative to the sleeve 14'. In this regard, it is preferred for an angularly positioned brace 64, 64' to be interconnected between the respective bracket 62, 62' and the support arm 60. The sleeve 14' may have identical ends 14a' so that it may be oriented either way on the pole 12.

As shown at FIG. 8, it is preferred for a cross-bar 66 to be pivotally connected to the support arm 60, as for example via a rivet or threaded fastener 68. Accordingly, the cross-bar 66 may be pivoted relative to support arm 60 from a parallel position relative to the support arm (as shown at the lower support arm of FIG. 7) to a perpendicular position relative to the support arm (as shown at the upper support arm of FIG. 7 and as shown at FIG. 8). It is preferred for both the support arm 60 and the cross-bar 66 to be provided with a plurality of holes 70, the purpose of which being for attaching articles, such as one or more flower pots, bird feeders 18' and bird houses thereto via a hook 72 or other attachment device.

While the foregoing preferred example detailed an article in the form of a bird feeder, other articles may be substituted therefor and would, in general, be connected with the sleeve as described.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A height adjustable apparatus comprising:
   a pole having a length;
   a sleeve concentrically mounted onto said pole so as to be slidable therealong, said sleeve having a near end, said sleeve having a plurality of sets of diametrically opposed notches formed at said near end thereof; and
   a retention mechanism functionally connected with said pole for providing a slide stop for said sleeve, said retention mechanism comprising:
   a plurality of sets of diametrically opposed holes formed in said pole at a plurality of locations along the length of said pole; and
   a pin removably receivable by said any set of said plurality of sets of diametrically opposed holes;
   wherein when said pin is received by a selected set of diametrically opposed holes, said pin abuts said near end of said sleeve so as to thereby prevent sliding movement of said sleeve therepast; and
   wherein each set of diametrically opposed notches provide concave surfaces sized for receiving said pin in a selected orientation with respect to said post.

2. The apparatus of claim 1, further comprising at least one support arm connected with said sleeve, said at least one support arm being radially oriented with respect to said sleeve.

3. The apparatus of claim 2, further comprising a cross-arm pivotally connected to said at least one support arm.

4. The apparatus of claim 3, further comprising a plurality of sets of diametrically opposed notches formed at said near end of said sleeve, each set of diametrically opposed notches providing concave surfaces sized for receiving said pin in a selected orientation with respect to said post.

5. The apparatus of claim 1, further comprising an article connected with said sleeve, said article having a center of gravity, said sleeve passing through said article at a location substantially at said center of gravity.

6. The apparatus of claim 5, wherein said article is a bird feeder; and wherein said sleeve passes entirely through said bird feeder.

7. The apparatus of claim 6, wherein said bird feeder has a feed reservoir therewithin; wherein said sleeve forms a feed retention wall of said feed reservoir.

8. The apparatus of claim 7, further comprising:
   a critter guard having a radially extended configuration; and
   connection means for connecting s aid critter guard to said sleeve.

9. The apparatus of claim 8, wherein said connection means provides a selectively removable connection of said critter guard to said sleeve.

10. The apparatus of claim 9, further comprising a plurality of sets of diametrically opposed notches formed at said near end of said sleeve, each set of diametrically opposed notches providing concave surfaces sized for receiving said pin in a selected orientation with respect to said post.

11. A height adjustable apparatus comprising:

a pole having a length;

a sleeve concentrically mounted onto said pole so as to be slidable therealong, said sleeve having a near end;

a retention mechanism functionally connected with said pole for providing a slide stop for said sleeve;

an article connected with said sleeve, said article having a center of gravity, said sleeve passing through said article at a location substantially at said center of gravity, wherein said sleeve passes entirely through said article;

a critter guard having a radially extended configuration; and connection means for connecting said critter guard to said sleeve.

12. The apparatus of claim 11, wherein said retention mechanism comprises:

a plurality of sets of diametrically opposed holes formed in said pole at a plurality of locations along the length of said pole; and a pin removably receivable by any set of said plurality of sets of diametrically opposed holes;

wherein when said pin is received by a selected set of diametrically opposed holes, said pin abuts said near end of said sleeve so as to thereby prevent sliding movement of said sleeve therepast.

13. The apparatus of claim 12, wherein said article is a bird feeder, wherein said bird feeder has a feed reservoir therewithin; wherein said sleeve forms a feed retention wall of said feed reservoir.

14. The apparatus of claim 13, further comprising a plurality of sets of diametrically opposed notches formed at said near end of said sleeve, each set of diametrically opposed notches providing concave surfaces sized for receiving said pin in a selected orientation with respect to said post.

15. The apparatus of claim 14, wherein said connection means provides a selectively removable connection of said critter guard to said sleeve.

16. A height adjustable bird feeder apparatus comprising:

a pole having a length;

a sleeve concentrically mounted onto said pole so as to be slidable therealong, said sleeve having a near end;

a retention mechanism functionally connected with said pole for providing a slide stop for said sleeve; and a bird feeder connected with said sleeve, said bird feeder having a center of gravity, said sleeve passing through said bird feeder at a location substantially at said center of gravity, wherein said sleeve passes entirely through said bird feeder;

wherein said bird feeder has a feed reservoir therewithin; and wherein said sleeve forms a feed retention wall of said feed reservoir.

17. The apparatus of claim 16, wherein said retention mechanism comprises:

a plurality of sets of diametrically opposed holes formed in said pole at a plurality of locations along the length of said pole;

a plurality of sets of diametrically opposed notches formed at said near end of said sleeve; and a pin removably receivable by any set of said plurality of sets of diametrically opposed holes;

wherein when said pin is received by a selected set of diametrically opposed holes, said pin abuts said near end of said sleeve so as to thereby prevent sliding movement of said sleeve therepast; and wherein each set of diametrically opposed notches providing concave surfaces sized for receiving said pin in a selected orientation with respect to said post.

18. The apparatus of claim 17, further comprising:

a critter guard having a radially extended configuration; and connection means for removably connecting said critter guard to said sleeve.

* * * * *